United States Patent
Horner et al.

(10) Patent No.: US 9,720,084 B2
(45) Date of Patent: Aug. 1, 2017

(54) DEPTH DISPLAY USING SONAR DATA

(71) Applicant: Navico Holding AS, Egersund (NO)

(72) Inventors: Ronald Horner, Collinsville, OK (US); Albert Griffin, Owasso, OK (US); Alan Proctor, Owasso, OK (US)

(73) Assignee: Navico Holding AS, Egersund (NO)

( * ) Notice: Subject to any disclaimer, the term of this patent is extended or adjusted under 35 U.S.C. 154(b) by 7 days.

(21) Appl. No.: 14/798,148

(22) Filed: Jul. 13, 2015

(65) Prior Publication Data

US 2016/0011310 A1    Jan. 14, 2016

Related U.S. Application Data

(60) Provisional application No. 62/024,416, filed on Jul. 14, 2014.

(51) Int. Cl.
*G06T 15/00* (2011.01)
*G01S 15/89* (2006.01)
(Continued)

(52) U.S. Cl.
CPC ............ *G01S 15/89* (2013.01); *G01C 13/008* (2013.01); *G01S 7/58* (2013.01); *G01S 7/6218* (2013.01);
(Continued)

(58) Field of Classification Search
CPC ......... G06T 19/00; G06T 17/20; G06T 17/00; G06T 15/10; G06T 15/00
(Continued)

(56) References Cited

U.S. PATENT DOCUMENTS

| 3,187,704 A | 6/1965 | Shatto, Jr. |
| 3,795,893 A | 3/1974 | Kritz et al. |

(Continued)

FOREIGN PATENT DOCUMENTS

| EP | 2602639 A1 | 6/2013 |
| JP | 2006-0647700 | 2/2006 |

OTHER PUBLICATIONS

"3D Reconstruction of seabed surface through sonar data of AUVs" (by Lei Zhang, Bruno Jouvencel, Zheng Fang, Xianbo Xiang, Indian Journal of Geo-Marine Sciences, vol. 41(6), Dec. 2012, pp. 509-515).*

(Continued)

*Primary Examiner* — Ke Xiao
*Assistant Examiner* — Gordon Liu
(74) *Attorney, Agent, or Firm* — Nelson Mullins Riley & Scarborough LLP

(57) ABSTRACT

Various implementations directed to a depth display using sonar data are provided. In one implementation, a marine electronics device may include a sonar signal processor and a memory having a plurality of program instructions which, when executed by the sonar signal processor, cause the processor to receive sonar data from a transducer array disposed on a vessel, where the sonar data corresponds to a marine environment proximate to the vessel. The memory may also have program instructions which, when executed by the sonar signal processor, cause the processor to generate point cloud data based on the received sonar data. The memory may further have program instructions which, when executed by the sonar signal processor, cause the processor to generate a depth display based on the point cloud data, where the depth display includes a depth line representing an underwater floor of the marine environment.

20 Claims, 6 Drawing Sheets

(51) Int. Cl.
| | | |
|---|---|---|
| *G01S 15/96* | (2006.01) | |
| *G01S 7/58* | (2006.01) | |
| *G06T 17/00* | (2006.01) | |
| *G01C 13/00* | (2006.01) | |
| *G01S 7/62* | (2006.01) | |
| *G06K 9/00* | (2006.01) | |
| *G06T 7/11* | (2017.01) | |
| *G06T 7/143* | (2017.01) | |
| *G01S 15/02* | (2006.01) | |

(52) U.S. Cl.
CPC .......... *G01S 7/6263* (2013.01); *G01S 7/6272* (2013.01); *G01S 7/6281* (2013.01); *G01S 15/96* (2013.01); *G06K 9/00624* (2013.01); *G06T 7/11* (2017.01); *G06T 7/143* (2017.01); *G06T 17/00* (2013.01); *G01S 15/025* (2013.01); *G06T 2207/10028* (2013.01); *G06T 2207/30181* (2013.01)

(58) Field of Classification Search
USPC .......................................................... 345/419
See application file for complete search history.

(56) References Cited

U.S. PATENT DOCUMENTS

| | | | |
|---|---|---|---|
| 3,893,076 A | 7/1975 | Clifford | |
| 4,312,053 A | 1/1982 | Lipsky | |
| 4,829,493 A | 5/1989 | Bailey | |
| 4,879,697 A | 11/1989 | Lowrance et al. | |
| 4,939,661 A | 7/1990 | Barker | |
| 5,025,423 A | 6/1991 | Earp | |
| 5,122,990 A | 6/1992 | Deines et al. | |
| 5,184,330 A | 2/1993 | Adams et al. | |
| 5,191,341 A | 3/1993 | Gouard et al. | |
| 5,537,380 A | 7/1996 | Sprankle, Jr. et al. | |
| 5,675,552 A | 10/1997 | Hicks et al. | |
| 6,185,505 B1 | 2/2001 | Kelmenson | |
| 6,201,767 B1 | 3/2001 | Lagace et al. | |
| 6,225,984 B1 | 5/2001 | Crawford | |
| 6,321,158 B1 | 11/2001 | DeLorme et al. | |
| 6,411,283 B1 | 6/2002 | Murphy | |
| 6,418,080 B2 | 7/2002 | Inouchi | |
| 6,421,299 B1 | 7/2002 | Betts et al. | |
| 6,761,692 B2 | 7/2004 | Angelsen et al. | |
| 6,816,782 B1 | 11/2004 | Walters et al. | |
| 7,002,579 B2 | 2/2006 | Olson | |
| 7,035,166 B2 | 4/2006 | Zimmerman et al. | |
| 7,113,449 B2 * | 9/2006 | Fairbairn ............... | A01K 91/20 367/111 |
| 7,236,426 B2 | 6/2007 | Turner et al. | |
| 7,366,056 B2 | 4/2008 | Frivik | |
| 7,430,461 B1 | 9/2008 | Michaels | |
| 7,542,376 B1 | 6/2009 | Thompson et al. | |
| 7,652,952 B2 | 1/2010 | Betts et al. | |
| 7,710,825 B2 | 5/2010 | Betts et al. | |
| 7,729,203 B2 | 6/2010 | Betts et al. | |
| 7,755,974 B2 | 7/2010 | Betts et al. | |
| 7,812,667 B2 | 10/2010 | Fagg | |
| 7,870,496 B1 | 1/2011 | Sherwani | |
| 7,890,867 B1 | 2/2011 | Margulis | |
| 8,019,532 B2 | 9/2011 | Sheha et al. | |
| 8,063,540 B2 | 11/2011 | Angelsen et al. | |
| 8,300,499 B2 | 10/2012 | Coleman et al. | |
| 8,305,840 B2 | 11/2012 | Maguire | |
| 8,717,847 B2 * | 5/2014 | Blake ..................... | G01S 15/89 367/88 |
| 8,949,096 B2 | 2/2015 | Jolliff | |
| 2002/0035574 A1 | 3/2002 | Dumas | |
| 2002/0093541 A1 | 7/2002 | Schileru-Key | |
| 2004/0193364 A1 | 9/2004 | Chojnacki | |
| 2005/0007880 A1 | 1/2005 | Zimmerman et al. | |
| 2005/0099887 A1 * | 5/2005 | Zimmerman ......... | G01S 7/52003 367/12 |
| 2005/0102101 A1 | 5/2005 | Beesley et al. | |
| 2006/0002235 A1 | 1/2006 | Knowles et al. | |
| 2006/0013066 A1 | 1/2006 | Nishimori et al. | |
| 2006/0119585 A1 | 6/2006 | Skinner | |
| 2006/0224940 A1 | 10/2006 | Lee | |
| 2007/0159922 A1 * | 7/2007 | Zimmerman ......... | G01S 7/52004 367/103 |
| 2007/0291589 A1 | 12/2007 | Kawabata et al. | |
| 2008/0008042 A1 | 1/2008 | Frivik et al. | |
| 2008/0080317 A1 | 4/2008 | Inouchi et al. | |
| 2008/0126935 A1 | 5/2008 | Blomgren | |
| 2008/0192575 A1 | 8/2008 | Coleman | |
| 2008/0204424 A1 | 8/2008 | Jin et al. | |
| 2009/0099871 A1 | 4/2009 | Gadodia | |
| 2009/0147623 A1 | 6/2009 | Betts et al. | |
| 2009/0179789 A1 | 7/2009 | Haughay, Jr. et al. | |
| 2009/0249247 A1 | 10/2009 | Tseng et al. | |
| 2009/0287409 A1 | 11/2009 | Summers | |
| 2010/0080082 A1 | 4/2010 | Betts et al. | |
| 2010/0142324 A1 | 6/2010 | Vogt | |
| 2010/0145601 A1 | 6/2010 | Kurtti et al. | |
| 2010/0157736 A1 | 6/2010 | Riordan et al. | |
| 2010/0199225 A1 | 8/2010 | Coleman et al. | |
| 2010/0226203 A1 | 9/2010 | Buttle et al. | |
| 2010/0250122 A1 | 9/2010 | Kubota et al. | |
| 2010/0302908 A1 | 12/2010 | Strong | |
| 2011/0013484 A1 | 1/2011 | Coleman et al. | |
| 2011/0013485 A1 | 1/2011 | Maguire | |
| 2011/0019887 A1 | 1/2011 | Roehrig et al. | |
| 2011/0025720 A1 | 2/2011 | Jo et al. | |
| 2011/0054784 A1 | 3/2011 | Wood et al. | |
| 2011/0154183 A1 | 6/2011 | Burns et al. | |
| 2012/0001773 A1 | 1/2012 | Lyons et al. | |
| 2012/0011437 A1 | 1/2012 | James et al. | |
| 2012/0014220 A1 | 1/2012 | DePasqua | |
| 2012/0069712 A1 | 3/2012 | Potanin et al. | |
| 2012/0106300 A1 | 5/2012 | Maguire | |
| 2012/0163126 A1 | 6/2012 | Campbell et al. | |
| 2012/0185801 A1 | 7/2012 | Madonna et al. | |
| 2012/0281507 A1 | 11/2012 | Rikoski | |
| 2013/0007665 A1 | 1/2013 | Chaudhri et al. | |
| 2013/0044569 A1 | 2/2013 | DePasqua | |
| 2013/0208568 A1 | 8/2013 | Coleman | |
| 2013/0242700 A1 | 9/2013 | Blake | |
| 2014/0010048 A1 | 1/2014 | Proctor | |
| 2014/0010049 A1 | 1/2014 | Proctor | |
| 2014/0210256 A1 | 7/2014 | Raats et al. | |
| 2014/0216325 A1 | 8/2014 | Hardy | |
| 2014/0269163 A1 | 9/2014 | Proctor | |
| 2014/0269192 A1 | 9/2014 | Proctor | |
| 2015/0085602 A1 | 3/2015 | Lebedev et al. | |
| 2015/0097838 A1 * | 4/2015 | Steward ................. | G01S 7/003 345/440 |

OTHER PUBLICATIONS

International Search Report and Written Opinion for PCT/IB2015/055301 mailed Dec. 4, 2015.
International Search Report and Written Opinion for PCT/US2013/048177; Oct. 21, 2013.
International Search Report and Written Opinion for PCT/US2013/048129 mailed Oct. 17, 2013.
Weverka, P. (2011), "PowerPoint 2007 All-In-One Desk Reference for Dummies", John Wiley & Sons, pp. 241-286.
Owner's Manual for GARMIN GPSMAP® 431, 400/500 series, available at: https://support.garmin.com/support/manuals/mauals.faces?partNo=010-00765-00&cID=148&pID=28752 , pp. i-iv; and 1-88, (copyright 2010; most recent revision date: Mar. 2012) (last visited Nov. 16, 2015).
PCT International Search Report and Written Opinion; PCT/IB2014/065158; Feb. 10, 2015.
PCT International Search Report and Written Opinion; PCT/IB2013/060285; Feb. 18, 2014.
PCT International Search Report and Written Opinion; PCT/US2013/047869; Oct. 21, 2013.
PCT International Report and Written Opinion; PCT/US2013/047926; Oct. 11, 2013.

(56) References Cited

OTHER PUBLICATIONS

PCT International Search Report and Written Opinion; PCT/US2013/047645; Sep. 27, 2013.
U.S. Appl. No. 14/689,764, filed Apr. 17, 2015, entitled "Sonar Transducer Assembly".
SIMRAD: NSS Operator Manual (2011), available at: http://simrad-yachting.com/Root/User%20Guides/NSS_OM_EN-988-10102-002_w.pdf (pp. 1-93).

* cited by examiner

DEPTH DISPLAY USING SONAR DATA

CROSS-REFERENCE TO RELATED APPLICATIONS

This application claims the benefit of U.S. Provisional Patent Application Ser. No. 62/024,416, filed Jul. 14, 2014, titled FORWARD LOOKING SONAR DISPLAY, and the disclosure of which is incorporated herein by reference.

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

Sonar data may be used to detect waterborne and/or underwater objects. In particular, when analyzed, sonar data may be used to determine depths of a marine environment, detect fish or other waterborne objects, locate wreckage, and/or the like. An operator of a vessel may use such sonar data to assist with the navigation of the vessel and/or to perform other functions.

SUMMARY

Described herein are implementations of various technologies relating to a depth display using sonar data. In one implementation, a marine electronics device may include a sonar signal processor and a memory having a plurality of program instructions which, when executed by the sonar signal processor, cause the processor to receive sonar data from a transducer array disposed on a vessel, where the sonar data corresponds to a marine environment proximate to the vessel. The memory may also have program instructions which, when executed by the sonar signal processor, cause the processor to generate point cloud data based on the received sonar data. The memory may further have program instructions which, when executed by the sonar signal processor, cause the processor to generate a depth display based on the point cloud data, where the depth display includes a depth line representing an underwater floor of the marine environment.

In another implementation, a sonar system disposed on a vessel may include a transducer array configured to receive one or more sonar return signals and to convert the one or more sonar return signals into sonar data, and may include a marine electronics device. The marine electronics device may include a sonar signal processor and a memory having a plurality of program instructions which, when executed by the sonar signal processor, cause the processor to receive sonar data from the transducer array, where the sonar data corresponds to a marine environment proximate to the vessel. The memory may also have program instructions which, when executed by the sonar signal processor, cause the processor to generate point cloud data based on the received sonar data. The memory may further have program instructions which, when executed by the sonar signal processor, cause the processor to generate a depth display based on the point cloud data, where the depth display includes a depth line representing an underwater floor of the marine environment.

In yet another implementation, a non-transitory computer-readable medium may have stored thereon computer-executable instructions which, when executed by a computer, cause the computer to receive sonar data from the transducer array, where the sonar data corresponds to a marine environment proximate to the vessel. The computer-executable instructions may also cause the computer to generate point cloud data based on the received sonar data. The computer-executable instructions may further cause the computer to generate a depth display based on the point cloud data, where the depth display includes a depth line representing an underwater floor of the marine environment.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

Figure 1:
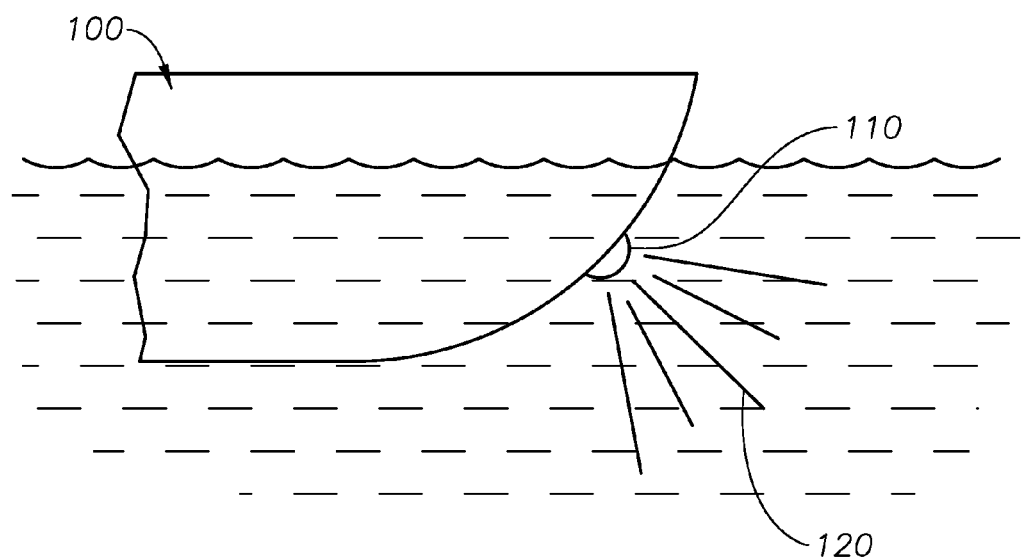
FIG. 1 illustrates a vessel having a transducer array disposed thereon in accordance with implementations of various techniques described herein.

Various implementations directed to a depth display using sonar data will now be described in the following paragraphs with reference to FIGS. 1-6.

Sonar System

In one implementation, a vessel configured to traverse a marine environment may use a sonar system disposed on and/or proximate to the vessel. The vessel may be a surface water vehicle, a submersible water vehicle, or any other implementation known to those skilled in the art. The sonar system, in particular, may be used to acquire sonar data corresponding to an area of water proximate to the vessel, including areas to the side of, behind, below, and/or to the front of the vessel. Such sonar data may be used to identify objects in the area of water. In one implementation, a sonar system may include a sonar transducer array and one or more marine electronics devices.

Transducer Array

The transducer array may be composed of one or more transducer elements, where at least one transducer element is configured to produce one or more sound pressure signals (i.e., one or more sonar output signals). In one implementation, the transducer array may receive one or more transmit signals from a marine electronics device (as further described below), and, in response, produce the one or more sonar output signals.

The transducer array may emit sonar output signals in a downward direction away from the vessel and into the area of water proximate to the vessel. Based on the transducer array's position with respect to the vessel and/or the arrangement of the transducer elements within the array itself, the sonar output signals may be emitted from one or more sides of the vessel, such as in front of the vessel. Properties of the sonar output signals generated by the transducer elements may be determined by an area and shape of the transducer elements, the sound wave frequency of the transducer elements, the sound velocity of the propagation medium (e.g., a body of water), and/or the like.

Reflected sonar output signals may be received by one or more of the transducer elements of the array in the form of one or more sonar return signals. A sonar return signal may represent an echo return that has reflected from a surface of an object in the area of water proximate to the vessel. In one implementation, an object may be a point on an underwater floor, a portion of a fish, a piece of debris, and/or any other waterborne object known to those skilled in the art. In turn, the transducer array may convert the sonar return signals into sonar data to be sent to the one or more marine electronics devices for processing (as further described below). The sonar data may be in form of electrical signals (e.g., analog or digital signals) that are representative of the sonar return signals.

The transducer array may be positioned at one or more locations that are on and/or proximate to the vessel, such as in one or more housings that are flexibly mounted to a hull of the vessel. In a further implementation, the transducer array may be mounted to the hull of the vessel such that the array is submerged in the water proximate to the vessel.

For example, FIG. 1 illustrates a vessel 100 having a transducer array 110 disposed thereon in accordance with implementations of various techniques described herein. In particular, the transducer array 110 may be coupled to a hull of the vessel 100, such that the transducer array 110 may be configured to downwardly emit one or more sonar output signals 120 in an area of water in front of the vessel 100. In such an example, the transducer array 110 may also be positioned to acquire sonar data from this area of water (i.e., in the direction of travel of the vessel 100). This sonar data may then be sent to one or more marine electronics devices (not shown) for processing, such that one or more objects in the water in front of the vessel 100 may be identified, as further described below.

In another implementation, one or more transducer elements of a transducer array may be arranged in a manner that is conducive to interferometry, as is known to those skilled in the art. In particular, the transducer elements may be spaced apart from one another within the transducer array at one or more known distances. As further described below, and as known to those skilled in the art, these known distances may be used to determine a phase of each sonar return signal received by each transducer element, which in turn may be used to determine a location of an object with respect to the vessel within the marine environment.

Marine Electronics Device

As noted above, the transducer array may transmit sonar data that is representative of the sonar return signals to one or more marine electronics devices. The one or more marine electronics devices may be configured to process the sonar data, as further described below.

The one or more marine electronics devices may include a sonar module (e.g., a fish finder sonar module), a multi-function display (MFD) device, a smart phone, and/or any other implementation used for processing sonar data known to those skilled in the art. In one such implementation, the sonar module may receive the sonar data from the transducer array, and then conduct one or more processing steps on the sonar data before transmitting the sonar data to another device, such as an MFD device, for display. In another implementation, the transducer array and the one or more marine electronics devices may be positioned at one or more locations on and/or proximate to a vessel.

As mentioned above, the one or more marine electronics devices may be configured to process the sonar data received from a transducer array. In one implementation, and as further described below, the marine electronics devices may perform such processing to determine locations of one or more objects with respect to the vessel within the marine environment, which can be used to generate a number of different images that portray information regarding the marine environment. In a further implementation, the marine electronics devices may perform interferometric processing on the sonar data, as is known to those skilled in the art.

Figure 2:
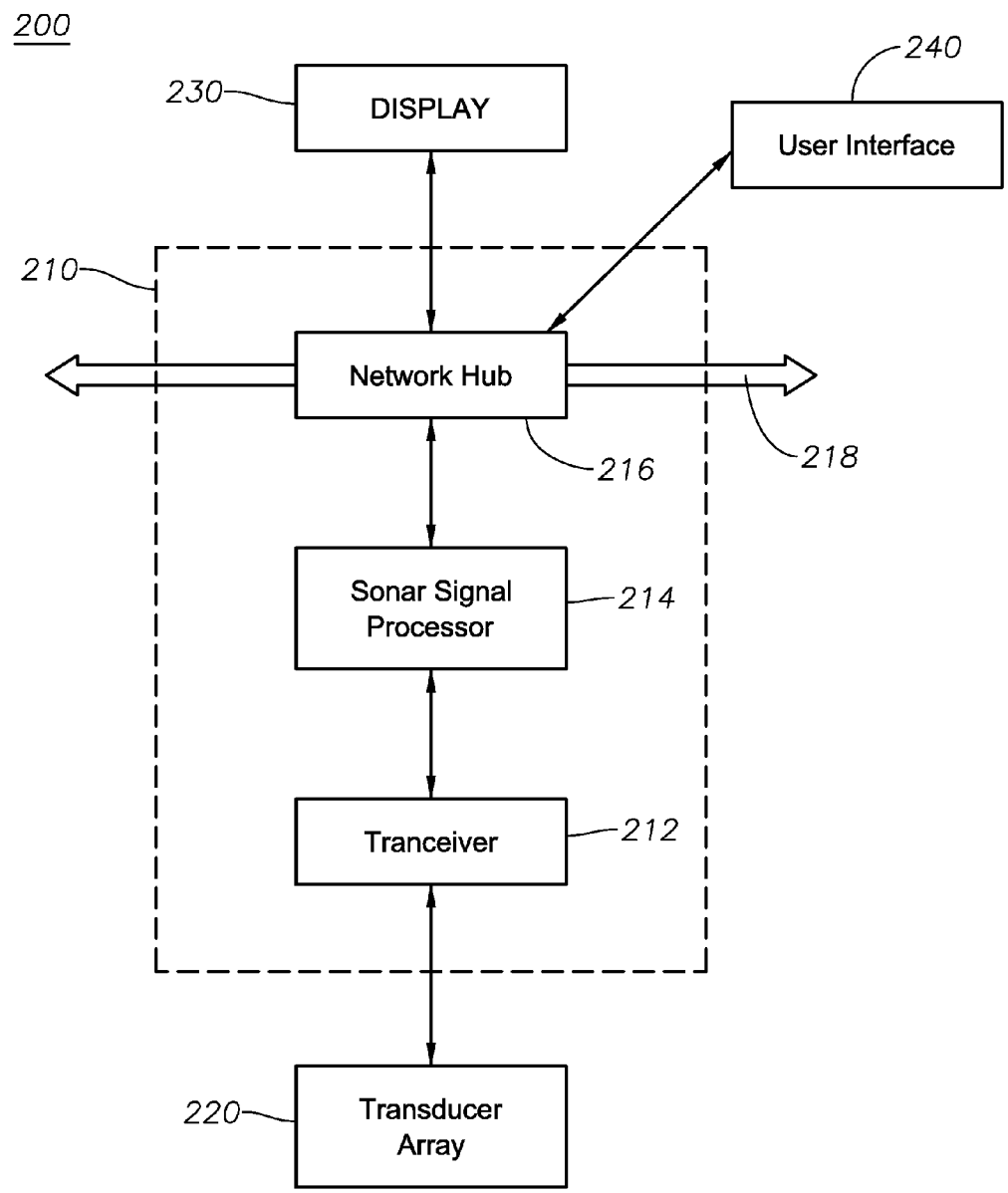
FIG. 2 illustrates a block diagram of a sonar system which includes a sonar module in accordance with implementations of various techniques described herein.

One implementation of a sonar system as discussed above is shown in FIG. 2. FIG. 2 illustrates a block diagram of a sonar system 200 which includes a sonar module 210 in accordance with implementations of various techniques described herein. The sonar system 200 may include various components, which may include means embodied in hardware and/or software configured to perform one or more corresponding functions. For example, in addition to the sonar module 210, the sonar system 200 may include a transducer array 220, a display element 230, and a user interface 240. Further, the sonar module 210 may include a transceiver 212, a sonar signal processor 214, and a network hub 216. One or more other components and/or peripheral devices known to those skilled in the art may be included in the sonar system 200.

As noted above, the transducer array 220 may transmit sonar data to the sonar module 210 for further processing. In particular, the transceiver 212 may receive the sonar data from the transducer array 220, and then transmit the received sonar data to the sonar signal processor 214 to carry out the processing. The sonar signal processor 214 may determine locations of one or more objects with respect to the vessel within the marine environment, and then render a number of different images that portray information regarding the marine environment. Using the network hub 216, those images may be transmitted to the display element 230 for display to a user.

Similar components of the sonar module 210 may be used in other marine electronics devices, such as in a multi-function display (MFD) device, a smart phone, and/or the like. Further implementations of the sonar system 200 and the sonar module 210 are discussed in greater detail below.

Sonar Data Processing

As noted above, an operator of a vessel may use sonar data to assist with the navigation of a vessel in a marine environment (i.e., an area of water). For example, the sonar data, when analyzed by one or more marine electronics devices, may be used to determine locations of objects within the marine environment, which, in turn, may be used to determine depths of an underwater floor, detect the presence of fish or other waterborne objects, and/or the like.

In one implementation, a transducer array of a sonar system, such as those described above, may be used to acquire sonar data corresponding to an area of water approximate to a vessel. This sonar data may be analyzed by one or more marine electronics devices of the sonar system, such that objects in the water near the vessel may be identified. In one implementation, a depth display may be generated based on the analyzed sonar data. A depth display may be defined as a visualization of the depths of an underwater floor of a marine environment proximate to a vessel.

Figure 3:
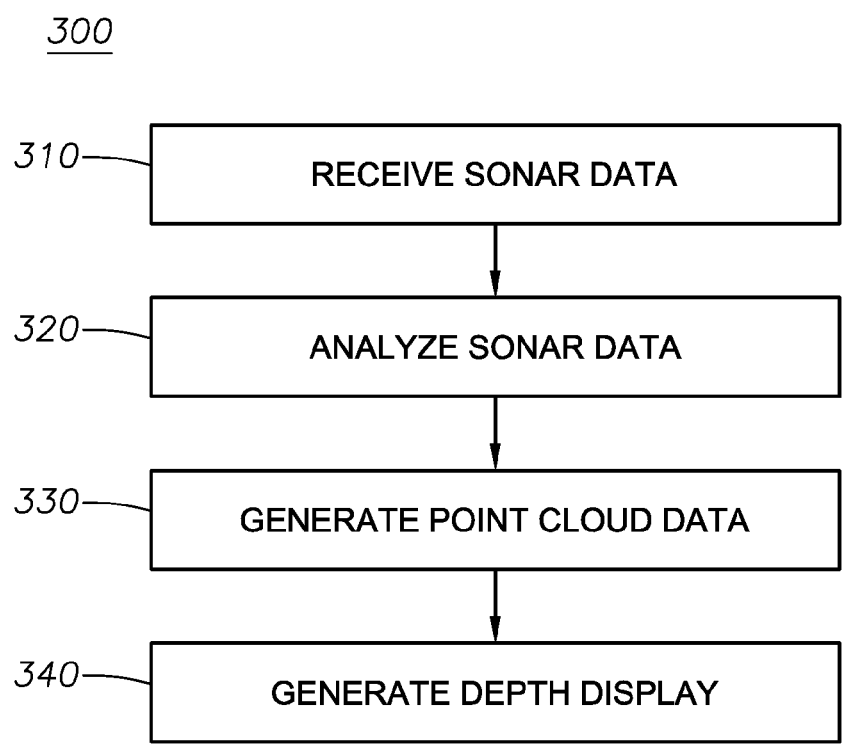
FIG. 3 illustrates a flow diagram of a method for generating a depth display in accordance with implementations of various techniques described herein.

FIG. 3 illustrates a flow diagram of a method 300 for generating a depth display in accordance with implementations of various techniques described herein. In one implementation, method 300 may be performed by a marine electronics device, such as a sonar module, an MFD device, a smart phone, and/or the like. As noted above, the marine electronics device may be positioned on and/or proximate to a vessel, and may be part of a sonar system. It should be understood that while method 300 indicates a particular order of execution of operations, in some implementations, certain portions of the operations might be executed in a different order. Further, in some implementations, additional operations or steps may be added to the method 300. Likewise, some operations or steps may be omitted.

At block 310, the marine electronics device may receive sonar data from a transducer array disposed on and/or proximate to the vessel. The transducer array may be similar to those described above.

As noted above, the transducer array may emit sonar output signals in a downward direction away from the vessel and into a marine environment proximate to the vessel (e.g., in front of the vessel). In return, the transducer array may receive sonar return signals that have reflected off of one or more objects in the marine environment. As noted above, an object may be a point on an underwater floor, a portion of a fish, a piece of debris, and/or any other waterborne object known to those skilled in the art. The transducer array may convert the sonar return signals into sonar data, which may then be sent to the marine electronics device.

At block 320, the marine electronics device may analyze the sonar data received from the transducer array. In one implementation, the marine electronics device may analyze the sonar data to determine locations of the one or more objects within the marine environment. In such an implementation, the marine electronics device may perform interferometric processing on the sonar data, as is known to those skilled in the art.

Interferometric processing of sonar data may refer to processing which uses a phase measurement of a sonar return signal at each transducer element to determine an angle of arrival of the sonar return signal. The angle of arrival may refer to the angle that the sonar return signal makes with the transducer array. As mentioned above, the transducer elements may be spaced apart from one another within the transducer array at particular distances.

In one implementation, for each sonar return signal of the sonar data, the marine electronics device may measure a phase at each of the spaced transducer elements using one or more techniques known to those skilled in the art. The differences between the phase measurements at each of the transducer elements may then be used to calculate the angle of arrival of the sonar return signal. In particular, the angle of arrival may be determined based on the spacing between the transducer elements within the transducer array, the phase differences of the sonar return signal, and/or the wavelength of the sonar return signal using one or more techniques known to those skilled in the art.

Further, the marine electronics device may determine a range for each sonar return signal of the sonar data. As known to those in the art, the range may be a distance determined based on the two-way travel time of the sonar return signal (e.g., the difference in time from when a sonar output signal is produced by the transducer array and when the sonar return signal is received by the transducer array). In addition, the amplitude of the sonar return signal may be determined by the marine electronics device.

Using one or more techniques known to those skilled in the art, the marine electronics device may then use the angle of arrival and the range of the sonar return signal to determine a location of the object proximate to the vessel from which the sonar return signal is reflected. In a further implementation, the amplitude of the sonar return signal may be used to determine the presence of and/or the type of the object. The marine electronics device may determine the object's location with respect to the transducer array or the vessel itself.

The marine electronics device may repeat the above processing for each sonar return signal of the sonar data in order to determine a location for each object in the marine environment from which each sonar return signal is reflected. In another implementation, the marine electronics device may also analyze the sonar data based on an offset angle of the transducer array. In particular, the transducer array may be positioned at a specific angle (i.e., the offset angle) with respect to the vessel. In such an implementation, the marine electronics device may compensate for the offset angle when determining the locations of the objects in the marine environment.

At block 330, the marine electronics device may generate point cloud data based on the analyzed sonar data. In some implementations, the locations of the objects (as determined at block 320) may be plotted with respect to the vessel using a Cartesian plot (i.e., an x-y plot) of the marine environment proximate to the vessel. In one such implementation, a horizontal axis (i.e., the x-axis) may be used to represent a range of distances proximate to the vessel (e.g. in front of or behind the vessel), and a vertical axis (i.e., the y-axis) may be used to represent a scale of depths of the marine environment below the vessel.

The marine electronics device may convert each location of the objects (as determined at block 320) into respective Cartesian points (i.e. x-y coordinates) that can be plotted with respect to the vessel. The locations may be converted into the respective x-y coordinates using any formula known to those skilled in the art. Accordingly, the generated point cloud data represents the collection of these converted Cartesian points for the determined locations. Once displayed, the converted Cartesian points may appear as one or more scattered groups of points in the shape of a cloud. In a further implementation, the marine electronics device may use a display element (e.g., the display element 230 of FIG. 2) to display the Cartesian plot of the marine environment with the plotted Cartesian points (i.e., the point cloud data).

At block 340, the marine electronics device may generate a depth display based on the point cloud data. As noted above, a depth display may be defined as a visualization of the depths of an underwater floor of a marine environment proximate to a vessel.

In particular, the depth display may be the same Cartesian plot as described above at block 320, except at least a portion of the plotted point cloud data is replaced with a depth line. The depth line may be a line in the Cartesian plot that illustrates the depths of the surface of the underwater floor in the marine environment proximate to the vessel.

The depth line may be generated using one or more image processing techniques. In particular, the image processing techniques may be used to identify trends in the point cloud data, where the trends may indicate the locations of the surface of the underwater floor. Displaying the depth line in place of a portion of the point cloud data may allow a user to more intuitively identify and/or understand the depths of the underwater floor.

In one implementation, to generate such a depth line, the marine electronics device may use an image processing technique to initially create one or more clusters of the plotted point cloud data. One or more clustering methods may be used to create the clusters, including a hierarchical-based clustering method, a centroid-based clustering method (e.g., k-means clustering), a distribution-based clustering method, a density-based clustering method, and/or any other clustering method known to those skilled in the art.

In one implementation of a hierarchical-based clustering method, the marine electronics device may group the plotted Cartesian points into one or more clusters based on one or more rules. A first rule may be that, to be assigned into any cluster, a Cartesian point should represent a sonar return signal having an amplitude greater than or equal to a predetermined threshold. A second rule may be that points within a predetermined Cartesian distance of one another should be grouped together into the same cluster. In some implementations, both the first and the second rules should be followed when placing a plotted Cartesian point into a cluster. Such rules may be used to better identify Cartesian points corresponding to a surface of the underwater floor as opposed to waterborne objects, fish, and/or the like Further, once the clusters are created, there may be clusters of varying size. The marine electronics device may identify the largest cluster. In one such implementation, the marine electronics device may divide the Cartesian plot of the depth display into multiple sectors, and the marine electronics device may identify the largest cluster in the sector that is farthest from vessel location along the y-axis.

Once the largest cluster has been identified, the marine electronics device may then identify one or more remaining clusters that are within a minimum Cartesian distance of the largest cluster. The clusters that are within the minimum Cartesian distance are then connected to the largest cluster using a line. In one such implementation, the line may be formed by connecting outlines of the clusters, where each outline is formed along a top side of the cluster. Further, the marine electronics device may employ a smoothing process on the line connecting the clusters.

The marine electronics device may continue identifying the remaining unconnected clusters that are within a minimum Cartesian distance of an already connected cluster. The marine electronics device may then connect these remaining clusters to those that are connected. The marine electronics device may repeat this process of identifying and connecting clusters for multiple iterations until no remaining unconnected clusters are within the minimum Cartesian distance described above.

The line formed by connecting the clusters is the depth line. The depth line may be displayed instead of the portion of the point cloud data that forms the connected clusters. In one implementation, no other point cloud data may be displayed in conjunction with the depth line. In another implementation, the depth line may be displayed in conjunction with the remaining portion of the point cloud data. The remaining portion of the point cloud data may include Cartesian points not grouped into a cluster and/or Cartesian points of the unconnected clusters.

As similarly described above, the marine electronics device may use a display element (e.g., the display element 230 of FIG. 2) to display the depth display of the marine environment with the generated depth line.

In another implementation, to generate a depth line, the marine electronics device may use an image processing technique that employs pixel quantization, blurring, and thresholding. In particular, a quantization of the Cartesian points (as described above with respect to block 330) may be performed, such that various Cartesian points are combined into a pixel of the display element. The Cartesian points may be combined based on the points' respective distances relative to the vessel and the amplitudes of their representative sonar return signals. Any quantization techniques known to those skilled in the art may be used.

Further, once the quantized pixels are generated, one or more blurring techniques may be used to generate a gradient. The one or more blurring techniques may include any known to those skilled in the art, including box filtering, median filtering, and Gaussian filtering. Upon generating the gradient, one or more thresholding algorithms may be used. The one or more thresholding algorithms may include any known to those skilled in the art, including Otsu's method. The one or more thresholding algorithms may also be based on the amplitudes of the sonar return signals. Using such algorithms, a bimodal image of the sonar data may be generated from the gradient, such that contours may be displayed in the image. Once the bimodal image has been created, further techniques may be used to generate the depth display with the depth line, such as by using a visibility check and/or ray tracing.

In some implementations, the depth display may be two-dimensional (2D). In another implementation, the method 300 for generating a depth display may be performed in real-time or substantially near real-time. In another implementation, in performing method 300, the marine electronics device may use a speed of the vessel when generating the depth display. The speed of the vessel may be calculated by or may be supplied to the marine electronics device. In particular, when performing method 300, the marine electronics device may increase the aggressiveness of filtering of the sonar data in response to high speeds traveled by the vessel when the sonar data was captured.

In some implementations, method 300 may be performed by multiple marine electronics devices. For example, method 300 may performed by a sonar module in conjunction with another marine electronics device, such as an MFD.

Figure 4:
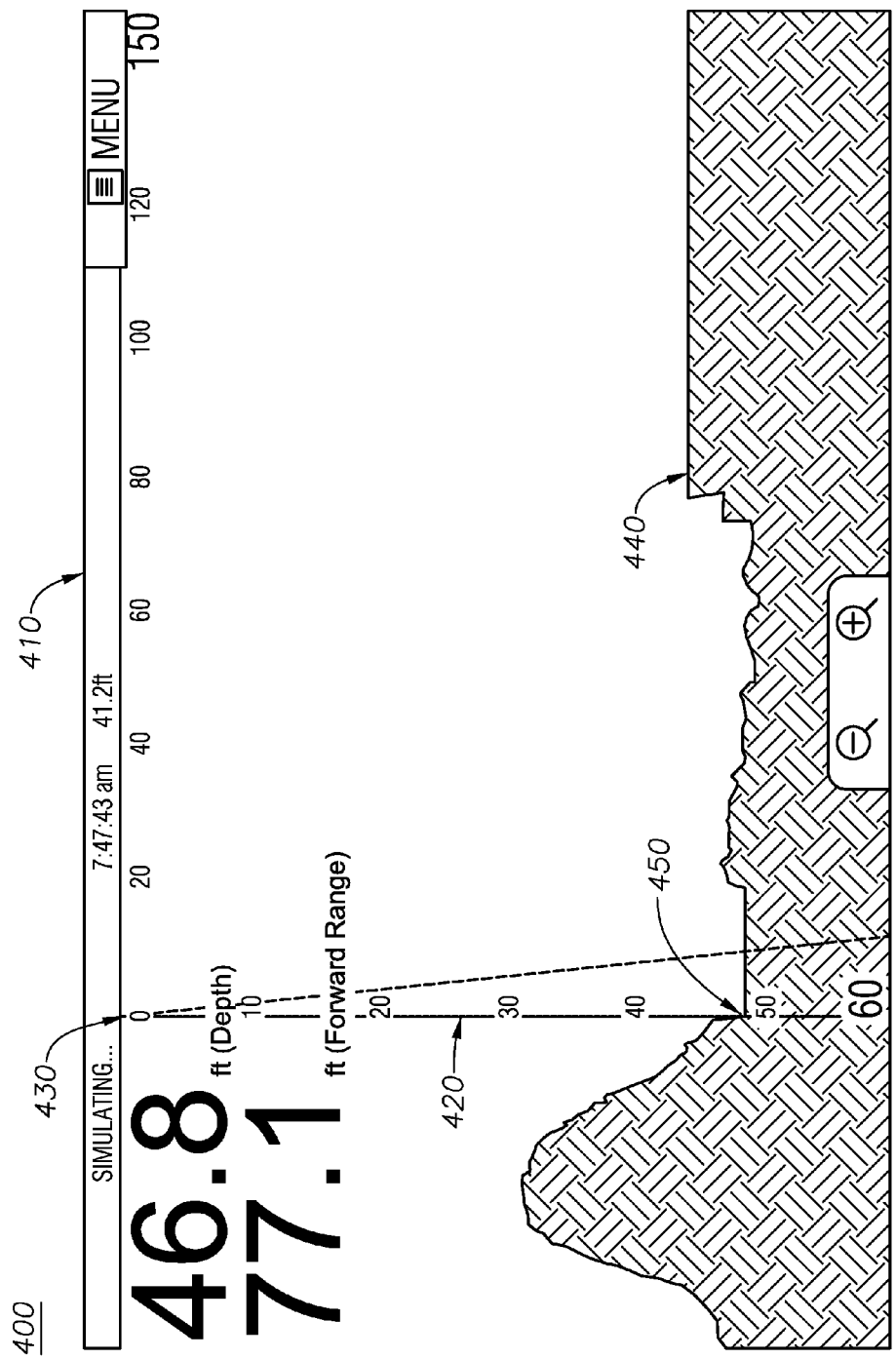
FIG. 4 illustrates a depth display in accordance with implementations of various techniques described herein.
Figure 5:
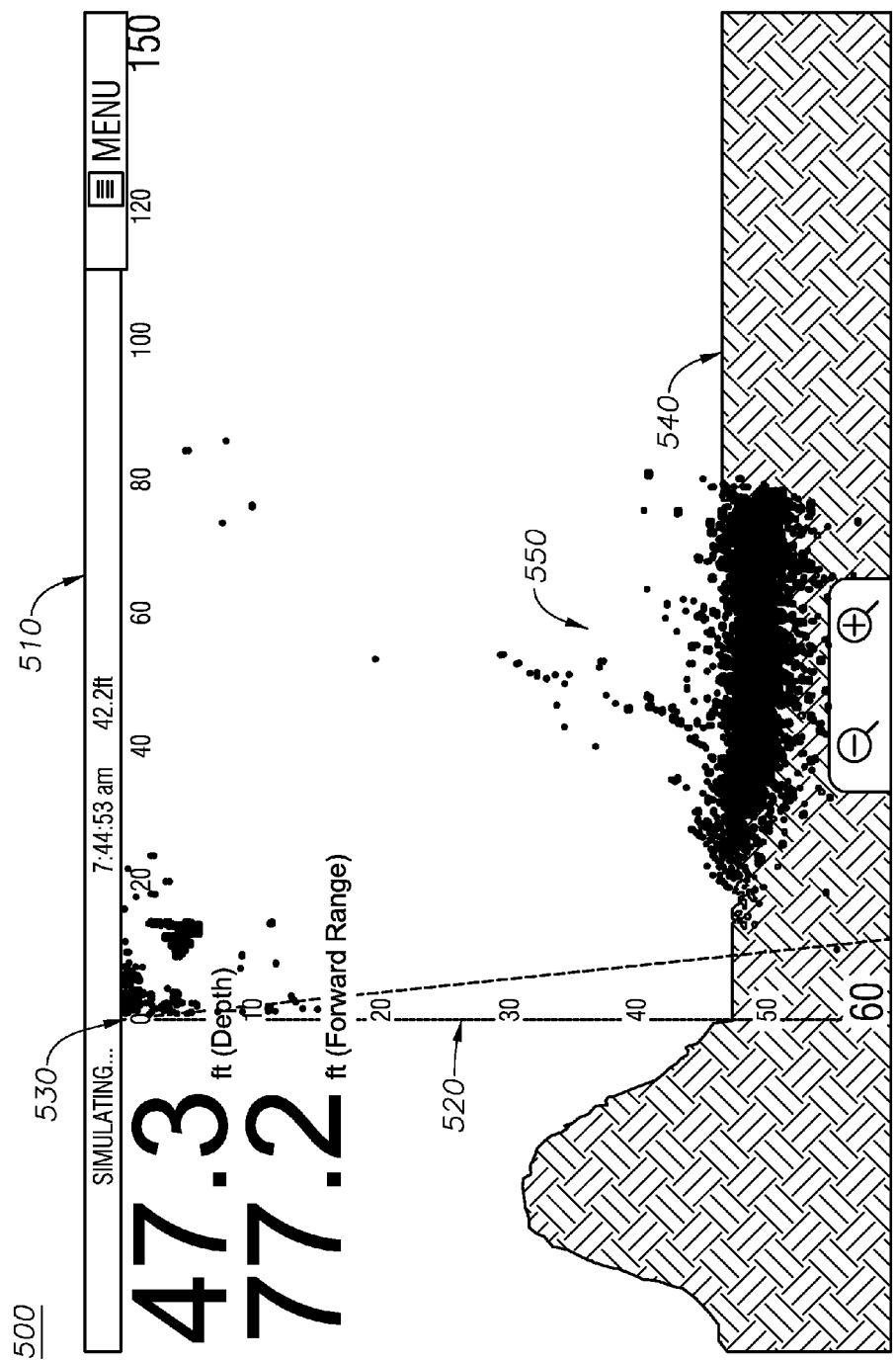
FIG. 5 illustrates a depth display in accordance with implementations of various techniques described herein.

FIGS. 4-5 illustrate examples of depth displays in accordance with implementations as described above.

In particular, FIG. 4 illustrates a depth display 400 in accordance with implementations of various techniques described herein. As noted above, the depth display 400 may be in the form of a Cartesian plot, in which locations of the one or more objects in front of a vessel may be plotted with respect to the vessel (i.e., point cloud data). It should be noted that other implementations of the depth display 400 may include Cartesian plots which illustrate objects to the side of and/or behind the vessel.

A horizontal axis 410 (i.e., the x-axis) may be used to display a range of distances in front of or ahead of the vessel, and a vertical axis 420 (i.e., the y-axis) may be used to display a scale of depths of the marine environment below the vessel. The position of the vessel in the marine environment may be represented at the point 440 where the x-axis and the y-axis intersect.

As shown, the portion of the depth display 400 that is to the right of the point 440 may represent the marine environment generally in front of the vessel. Accordingly, the range of distances along the horizontal axis 410 may increase in value in a rightward direction. Further, the scale of depths along the vertical axis 420 may increase in value in a downward direction.

The depth display 400 may also include a depth line 440 plotted in the depth display 400. The depth line 440 may be generated using point cloud data of the marine environment generally in front of the vessel using method 300 as described above. As is also noted above, the depth line 440 may be displayed instead of the portion of the point cloud data that forms the connected clusters of plotted points.

Though not shown in FIG. 4, the depth display 400 as shown by a display element may include a cursor that is movable via user input to a marine electronics device and/or a user interface. The depth display 400 may visualize the range and depth values (i.e., x-y coordinates) of the cursor within the depth display, such as by displaying the values near the cursor.

FIG. 5 illustrates a depth display 500 in accordance with implementations of various techniques described herein. The depth display 500 may include a horizontal axis 510, a vertical axis 520, a point 530, and a depth line 540. The depth display 500 and its components may be similar to the depth display 500 and its components as described above with respect to FIG. 4.

As shown in the depth display 500, point cloud data 550 may be displayed in conjunction with the depth line 540. As noted above, the point cloud data 550 may include Cartesian points not grouped into a cluster and/or Cartesian points of unconnected clusters. Including such point cloud data in the depth display may allow the operator of the vessel to identify various waterborne objects in the marine environment other than the surface of the underwater floor. For example, the displayed point cloud data 550 may represent the locations of a portion of a fish, a piece of debris, and/or any other waterborne object known to those skilled in the art.

Returning to FIG. 4, in another implementation, the portion of the depth display 400 below the depth line 440 may be filled in with one or more colors. Such a filling-in of color may provide a visual contrast of the underwater floor when compared with the rest of the marine environment in the depth display 400, thereby further assisting the operator of the vessel with identifying and/or understanding the depths of the underwater floor.

In yet another implementation, the marine electronics device may use auto-ranging to determine the amount of area of the marine environment that is shown in the depth display 400. The amount of area of the marine environment shown in the depth display 400 may be based on the range of distances shown along the horizontal axis 410 and the scale of depths shown along the vertical axis 420.

In such an implementation, the scale of depths shown along the vertical axis 420 may be based on a depth value 450 of the depth line 440 (i.e., the underwater floor) directly below the point 440 (i.e., the vessel). In one example, a maximum depth value shown on the vertical axis 420 may be equal to a sum of the depth value 450 and a predetermined constant value (e.g., 10 feet).

Further, the range of distances shown along the horizontal axis 410 and to the right of the point 440 (i.e., in front of the vessel) may be determined based on the vertical axis 420. In particular, a maximum distance value shown on the horizontal axis 410 may be equal to the maximum depth value shown on the vertical axis 420 multiplied by a predetermined multiplier.

As noted above, the depth display may be generated in real-time or substantially near real-time. In particular, the depth display may be generated as a vessel travels in a marine environment. In one implementation, the depth display may be stored in memory as the vessel travels in the marine environment, such that the depth display is continuously updated and displayed based on real-time or substantially near real-time sonar data.

In such an implementation, the depth display may be scrollable such that a history of the depth display may be viewed. As shown in FIG. 4, the previously generated (i.e., stored) iterations of the depth display 400 may be displayed to the left of the point 440. A user input may be provided to indicate to the marine electronics device to more fully display these previously generated iterations. For example, a rightward swipe gesture on a touch screen showing the depth display 400 may result in the displaying of the previously generated iterations of the depth display 400. In such an implementation, the marine electronics device may display the depth line 440 in the previously generated iterations and the depth line 440 generated based on real-time or substantially near real-time sonar data as being connected.

In sum, implementations relating to a depth display using sonar data, described above with respect to FIGS. 1-5, may help an operator of a vessel to identify and/or understand the depths of the underwater floor proximate to the vessel. In particular, the depth line of the depth display may assist the operator with identifying contours of the underwater floor, including dangerously low depths that may lie ahead.

Sonar System (Continued)

Further implementations of a sonar system, including the sonar system 200 of FIG. 2, are discussed in greater detail below.

Transducer Array

In some implementations, referring back to FIG. 2, the transducer array 220 and/or sonar module 210 may be positioned within a housing. The housing may include a recessed portion defining a containment volume for holding the transducer elements. To prevent cavitation or the production of bubbles due to uneven flow over the housing, the housing (and in particular the containment volume portion of the housing) may have a gradual, rounded or otherwise streamlined profile to permit laminar flow of water over the housing. In some examples, an insulated cable may provide a conduit for wiring to couple each of the transducer elements to the sonar module 210. As detailed herein, any of a number of configurations of transducer elements and transducer arrays may be provided within the housing.

The shape of a transducer element may largely determine the type of beam that is formed when that transducer element transmits a sonar pulse (e.g., a circular transducer element emits a cone-shaped beam, a linear/rectangular transducer element emits a fan-shaped beam, etc.). In some implementations, a transducer element may comprise one or more transducer elements positioned to form one transducer element. For example, a rectangular transducer element may comprise two or more rectangular transducer elements aligned with each other so as to be collinear. In some implementations, three transducer elements aligned in a collinear fashion (e.g., end to end) may define one rectangular transducer element.

Likewise, transducer elements may comprise different types of materials that cause different sonar pulse properties upon transmission. For example, the type of material may determine the strength of the sonar pulse. Additionally, the type of material may affect the sonar returns received by the transducer element. As such, implementations described herein are not meant to limit the shape or material of the transducer elements.

In some implementations, each of the transducer elements may be a rectangular transducer element. Thus, for example, each of the transducer elements may be substantially rectangular in shape and made from a piezoelectric material such as a piezoelectric ceramic material, as is well known in the art. In such a regard, the transducer elements may be configured to transmit and/or receive a fan-shaped beam (e.g., 15° by 90°, though any fan shaped beam is contemplated).

As noted above, any of the transducer elements described herein may be configured to transmit and receive sonar pulses (e.g., transmit/receive transducer elements). While the transducer elements may be described herein as transmit/receive transducer elements, in some implementations, the transducer elements may be configured as receive-only transducer elements, or in other cases, transmit-only transducer elements.

In some implementations, each transducer element may be configured to operate at any frequency, including operation over an array of frequencies. Along these lines, it should be understood that many different operating ranges could be provided with corresponding different transducer element sizes and shapes (and corresponding different beamwidth characteristics). Moreover, in some cases, the sonar module 210 may include a variable frequency selector, to enable an operator to select a particular frequency of choice for the current operating conditions.

The active element in a given transducer may comprise at least one crystal. Wires may be soldered to coatings so that the crystal can be attached to a cable which transfers the electrical energy from the transmitter to the crystal. As an example, when the frequency of the electrical signal is the same as the mechanical resonant frequency of the crystal, the crystal may move, creating sound waves at that frequency. The shape of the crystal may determine both its resonant frequency and shape and angle of the emanated sound beam. Frequencies used by sonar devices vary, but may range from 50 KHz to over 900 KHz depending on application. Some sonar systems may vary the frequency within each sonar pulse using "chirp" technology. These frequencies may be in the ultrasonic sound spectrum and thus inaudible to humans.

It should be noted that although the widths of various beams are described herein, the widths being referred may not correspond to actual edges defining limits to where energy is placed in the water. As such, although beam patterns and projections of beam patterns are generally described herein as having fixed and geometrically shaped and sharply defined boundaries, those boundaries merely correspond to the −3 dB (or half power) points for the transmitted beams. In other words, energy measured outside of the boundaries described is less than half of the energy transmitted, but this sound energy is present nonetheless. Thus, some of the boundaries described are merely theoretical half power point boundaries.

Marine Electronics Device

In some implementations, again referring to FIG. 2, the display element 230, the user interface 240, and/or the sonar module 210 may be configured to communicate with one another via a network 218 and/or the network hub 216. The network 218 and/or the network hub 216 may be implemented using any wired and/or wireless technology known to those skilled in the art, including, but not limited to, Ethernet, the National Marine Electronics Association (NMEA) framework, Bluetooth, Wi-Fi, LAN, WLAN, cellular, and/or any other network implementation. In some implementations, the display element 230, the user interface 240, and/or the sonar module 210 may be configured to communicate with one another directly without the use of the network 218 or the network hub 216. The display element 230, the sonar module 210, and/or the user interface 240 may be part of a single device, such that at least two of those components are located in a single housing. The network hub 216 may include one or more interface ports to allow components, such as the display element 230 or the user interface 240, to communicate with the network 218. In one implementation, the network hub 216 may be configured to allow for plug-and-play communication with the display element 230 and/or the user interface 240.

The display element 230 may be configured to display images, where it may receive processed sonar data from the sonar signal processor 214 and render the data into one or more windows on the display element 230. For example, the display element 230 may include a liquid crystal display (LCD) screen, a touch screen display, or any other implementation known to those skilled in the art. In one implementation, the display element 230 may include two or more displays.

A user may interact with the sonar system 200 through the user interface 240. The user interface 240 may include, for example, a keyboard, keypad, function keys, mouse, scrolling device, input/output ports, touch screen, or any other user interface known to those skilled in the art. In one implementation, the user interface 240 may be integrated into the display element 230.

The sonar signal processor 214 may be any device or circuitry operating in accordance with hardware and/or software which configures the device or circuitry to perform the corresponding functions of the sonar signal processor 214 as described herein. In some implementations, the sonar signal processor 214 may include a processor, a processing element, a coprocessor, a controller, an application specific integrated circuit (ASIC), a field programmable gate array (FPGA), a hardware accelerator, or any other implementation known to those skilled in the art, where the sonar signal processor 214 is configured to execute various programmed operations or instructions stored in a memory device. The sonar signal processor 214 may further include multiple compatible additional hardware and/or software items configured to: (i) implement signal processing or enhancement features to improve display characteristics, data, and/or images, (ii) collect or process additional data, such as time, temperature, global positioning system (GPS) information, and/or waypoint designations, or (iii) filter extraneous data to better analyze the collected data. The sonar signal processor 214 may further implement notices and alarms, such as those determined or adjusted by a user, to reflect depth, presence of fish, and/or proximity of other watercraft. Still further, the sonar signal processor 214, in combination with suitable memory, may store incoming data from the transducer array 220, screen images for future playback, transfer and/or alter images with additional processing to implement zoom or lateral movement, or correlate data such as fish or bottom features to a GPS position or temperature.

The sonar module 210 may include standard elements and/or components, including memory (e.g., non-transitory computer-readable storage medium), at least one database, power, peripherals, and various other computing elements and/or components that may not be specifically shown in FIG. 2. The user interface 240 may be used to receive one or more preferences from a user of the display element 230 for managing or utilizing the sonar system 200, including interfacing with the transducer array 220. Further, the user may set up desired behavior of the sonar module 210 and/or transducer array 220 via user-selected preferences using the user interface 240. For example, as mentioned above, the sonar module 210 may be configured to transmit one or more transmit signals to the transducer array 220, such that, in response, the transducer array 220 produces one or more sonar output signals. Various elements and/or components of the system 200 that may be useful for the purpose of implementing method 300 (see FIG. 3) may be added, included, and/or interchanged, in manner as described herein.

Using the transceiver 212, various types of data including sonar data may be communicated, transmitted, and/or relayed between the sonar module 210 and the transducer 220. In another implementation, the sonar module 210 may interface and communicate with the transducer array 220 via wired and/or wireless connections known to those skilled in the art.

The sonar module 210 may include computer-executable instructions related to a storage handler or software module configured to automatically record the sonar data in memory (e.g., a database) upon receiving the sonar data from the transducer 220. In some examples, recording the sonar data generated by the transducer 220 may include logging the sonar data generated by the transducer 220 and the geographical coordinate data (i.e., GPS data) associated with the transducer 220. In some examples, the storage handler may be configured to automatically upload the sonar data and/or the GPS data to at least one database via a network, such as, e.g., a remote server database (e.g., a cloud based server) via a communication network (e.g., a cloud based network), including a wireless communication network.

A data manager of the sonar module 210 may include computer-executable instructions related to a display handler or software module configured to display images associated with the sonar data, e.g., to a user via the display element 230. The display handler may be configured to generate image data associated with the sonar data and further display images generated from the image data and sonar data to a user via a display. The display handler may be configured to display images associated with a map to the user based on the sonar data and the geographical coordinate data (i.e., GPS data).

Figure 6:
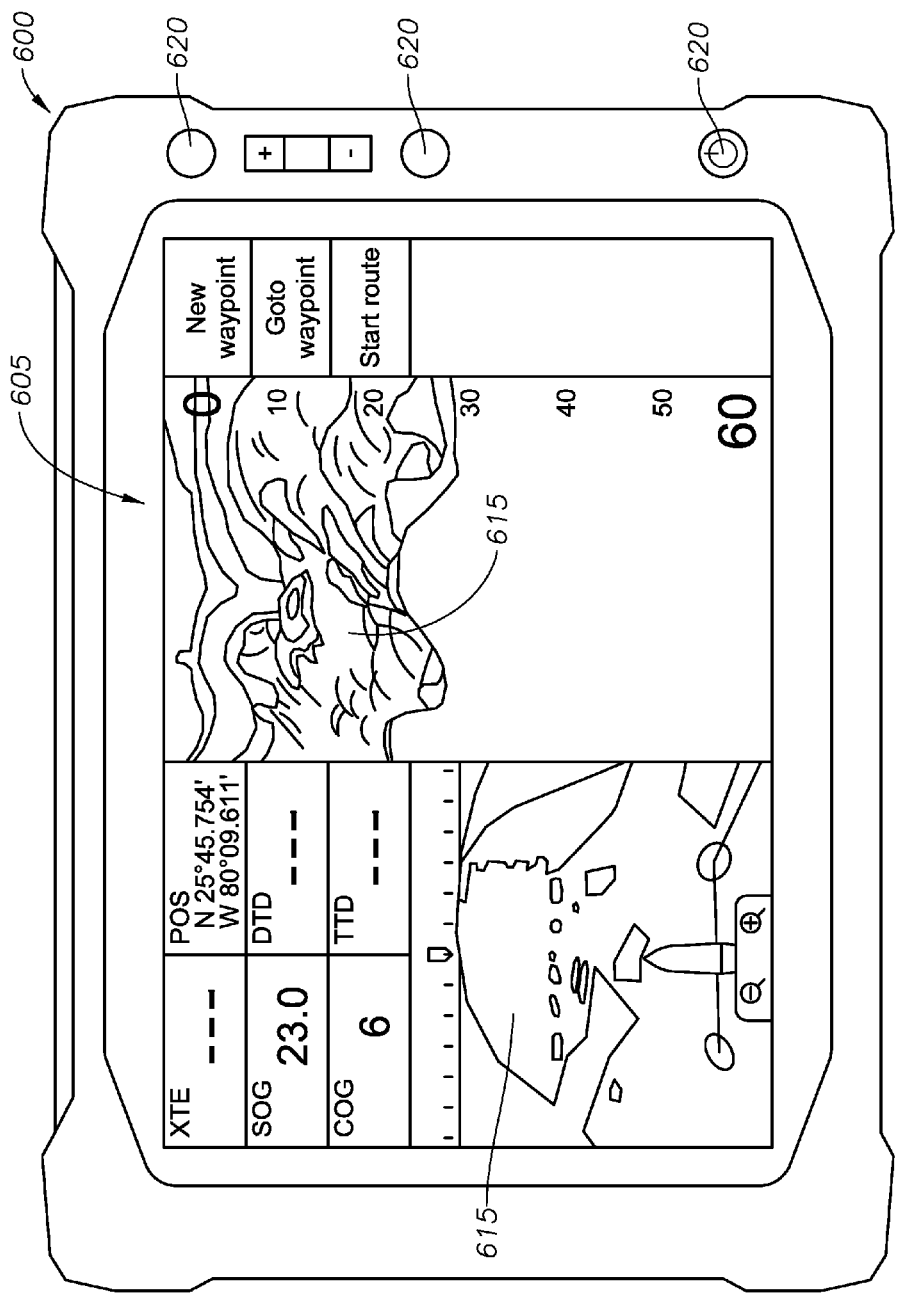
FIG. 6 illustrates an example schematic of a marine electronics device in accordance with implementations of various techniques described herein.

FIG. 6 illustrates an example schematic of a marine electronics device 600 in accordance with implementations of various techniques described herein. The marine electronics device 600 may be in the form of an MFD device.

The MFD device 600 includes a screen 605. In certain implementations, the screen 605 may be sensitive to touching by a finger. In other implementations, the screen 605 may be sensitive to the body heat from the finger, a stylus, or responsive to a mouse. The marine electronics device 600 may be attached to a NMEA bus or network. The MFD device 600 may send or receive data to or from another device attached to the NMEA 2000 bus. For example, the MFD device 600 may transmits commands and receive data from a motor or a sensor using an NMEA 2000 bus. In one implementation, the MFD device 600 may be capable of steering a vessel and controlling the speed of the vessel, i.e., autopilot. For example, one or more waypoints may be input to the marine electronics device 600, and the MFD device 600 may steer a vessel to the one or more waypoints. The MFD device 600 may transmit or receive NMEA 2000 compliant messages, messages in a proprietary format that do not interfere with NMEA 2000 compliant messages or devices, or messages in any other format. The device 600 may display marine electronic data 615. The marine electronic data types 615 may include chart data, radar data, sonar data, steering data, dashboard data, navigation data, fishing data, engine data, and the like. The MFD device 600 may also include a plurality of buttons 620, which may be either physical buttons or virtual buttons, or a combination thereof. The MFD device 600 may receive input through a screen 605 sensitive to touch or buttons 620.

As mentioned above, a marine electronics device may be used to record and process sonar data. The marine electronics device may be operational with numerous general purpose or special purpose computing system environments or configurations. The marine electronics device may include any type of electrical and/or electronics device capable of processing data and information via a computing system. In one implementation, the marine electronics device may be a marine instrument, such that the marine electronics device may use the computing system to display and/or process the one or more types of marine electronics data.

Implementations of various technologies described herein may be operational with numerous general purpose or special purpose computing system environments or configurations. Examples of well-known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. Further, each program module may be implemented in its own way, and all need not be implemented the same way. While program modules may all execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may be implemented in the context of marine electronics, such as devices found in marine vessels and/or navigation systems. Ship instruments and equipment may be connected to the computing systems described herein for executing one or more navigation technologies. The computing systems may be configured to operate using various radio frequency technologies and implementations, such as sonar, radar, GPS, and like technologies.

The various technologies described herein may also be implemented in distributed computing environments where tasks are performed by remote processing devices that are linked through a communications network, e.g., by hardwired links, wireless links, or combinations thereof. In a distributed computing environment, program modules may be located in both local and remote computer storage media including memory storage devices.

The discussion of the present disclosure is directed to certain specific implementations. It should be understood that the discussion of the present disclosure is provided for the purpose of enabling a person with ordinary skill in the art to make and use any subject matter defined herein by the subject matter of the claims.

It should be intended that the subject matter of the claims not be limited to the implementations and illustrations provided herein, but include modified forms of those implementations including portions of the implementations and combinations of elements of different implementations within the scope of the claims. It should be appreciated that in the development of any such implementation, as in any engineering or design project, numerous implementation-specific decisions should be made to achieve a developers' specific goals, such as compliance with system-related and business related constraints, which may vary from one implementation to another. Moreover, it should be appreciated that such a development effort maybe complex and time consuming, but would nevertheless be a routine undertaking of design, fabrication, and manufacture for those of ordinary skill having benefit of this disclosure. Nothing in this application should be considered critical or essential to the claimed subject matter unless explicitly indicated as being "critical" or "essential."

Reference has been made in detail to various implementations, examples of which are illustrated in the accompanying drawings and figures. In the following detailed description, numerous specific details are set forth to provide a thorough understanding of the present disclosure. However, the present disclosure may be practiced without these specific details. In other instances, well-known methods, procedures, components, circuits and networks have not been described in detail so as not to unnecessarily obscure aspects of the embodiments.

It should also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations and is not intended to limit the present disclosure. As used in the description of the present disclosure and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised without departing from the basic scope thereof, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A marine electronics device, comprising:
   a display element;
   a sonar signal processor;
   a memory comprising a plurality of program instructions which, when executed by the sonar signal processor, cause the processor to:
      receive sonar data from a transducer array disposed on a vessel, wherein the transducer array includes a plurality of transducer elements spaced apart at one or more known distances and configured to receive respective sonar signals for conversion into the sonar data, and wherein the sonar data corresponds to a marine environment proximate to the vessel;
      generate point cloud data based on the received sonar data;
      generate a depth display based on the point cloud data, wherein the depth display includes a depth line representing an underwater floor of the marine environment, wherein the depth line is generated using the point cloud data; and
      display, on the display element, the depth display, wherein the depth display includes the depth line.

2. The marine electronics device of claim 1, wherein the program instructions which, when executed by the sonar signal processor, further cause the processor to:
   analyze the received sonar data to determine one or more locations of one or more objects of the marine environment using interferometry; and
   generate the point cloud data based on the one or more determined locations.

3. The marine electronics device of claim 2, wherein the program instructions which, when executed by the sonar signal processor, cause the processor to analyze the received sonar data, further comprise program instructions which, when executed by the sonar signal processor, cause the processor to:
   determine an angle of arrival, an amplitude, and a range for respective sonar return signals of the sonar data; and
   determine the one or more locations based on the angle of arrival, the amplitude, and the range of the respective sonar return signals.

4. The marine electronics device of claim 2, wherein the point cloud data comprises respective x-y coordinates of the one or more determined locations for an x-y plot of the marine environment.

5. The marine electronics device of claim 1, wherein the depth display comprises a visualization of depths of one or more objects of the marine environment.

6. The marine electronics device of claim 1, wherein:
the depth display comprises an x-y plot having one or more locations of one or more objects of the marine environment plotted with respect to the vessel;
the point cloud data comprises respective x-y coordinates of the one or more determined locations; and
the depth line comprises a line in the x-y plot representing the depths of the surface of the underwater floor in the marine environment.

7. The marine electronics device of claim 1, wherein the program instructions which, when executed by the sonar signal processor, further cause the processor to generate the depth line using image processing, wherein the program instructions cause the processor to:
create one or more clusters of the point cloud data;
identify the largest cluster of the one or more clusters;
identify one or more remaining clusters of the one or more clusters that are within a minimum Cartesian distance of the largest cluster; and
connect the largest cluster to the one or more remaining clusters using the depth line.

8. The marine electronics device of claim 7, wherein the program instructions which, when executed by the sonar signal processor, cause the processor to create the one or more clusters, further comprise program instructions which, when executed by the sonar signal processor, cause the processor to:
assign a first point of the point cloud data to the one or more clusters if the first point represents a sonar return signal having an amplitude greater than or equal to a predetermined threshold; and
assign the first point to a particular cluster if the particular cluster includes at least a second point within a predetermined Cartesian distance of the first point.

9. The marine electronics device of claim 7, wherein the program instructions which, when executed by the sonar signal processor, cause the processor to create the one or more clusters, further comprise program instructions which, when executed by the sonar signal processor, cause the processor to:
connect respective outlines of the largest cluster and the one or more remaining clusters.

10. The marine electronics device of claim 7, wherein the program instructions which, when executed by the sonar signal processor, further cause the processor to:
iteratively connect connected clusters of the one or more clusters to unconnected clusters of the one or more clusters using the depth line.

11. The marine electronics device of claim 1, wherein the depth display includes the depth line in place of connected clusters of the point cloud data.

12. The marine electronics device of claim 11, wherein the program instructions which, when executed by the sonar signal processor, further cause the processor to:
display the depth line in conjunction with a portion of the point cloud data, wherein the portion of the point cloud data includes at least one of: points unassigned to a cluster and points of unconnected clusters.

13. The marine electronics device of claim 1, wherein the program instructions which, when executed by the sonar signal processor, cause the processor to generate the depth display, further comprise program instructions which, when executed by the sonar signal processor, cause the processor to:
generate the depth display in real time or substantially near real time.

14. The marine electronics device of claim 1, wherein the program instructions which, when executed by the sonar signal processor, further cause the processor to:
fill in the depth display below the depth line with one or more colors.

15. The marine electronics device of claim 1, wherein the depth display comprises:
a vertical axis representing a scale of depths in the marine environment, wherein a maximum depth value of the vertical axis is set based on a depth of the underwater floor beneath the vessel; and
a horizontal axis representing a range of distances of the marine environment in front of the vessel, wherein a maximum distance value is set based on a multiple of the maximum depth value.

16. The marine electronics device of claim 1, wherein the program instructions which, when executed by the sonar signal processor, further cause the processor to:
store the depth display in the memory; and
scroll through the stored depth display based on a user input.

17. A sonar system disposed on a vessel, comprising:
a transducer array comprising a plurality of transducer elements spaced apart at one or more known distances, the transducer array being configured to receive sonar return signals from the plurality of transducer elements and to convert the sonar return signals into sonar data; and
a marine electronics device, comprising:
a display element;
a sonar signal processor;
a memory comprising a plurality of program instructions which, when executed by the sonar signal processor, cause the processor to:
receive sonar data from the transducer array, wherein the sonar data corresponds to a marine environment proximate to the vessel;
generate point cloud data based on the received sonar data;
generate a depth display based on the point cloud data, wherein the depth display includes a depth line representing an underwater floor of the marine environment, wherein the depth line is generated using the point cloud data; and
display, on the display element, the depth display, wherein the depth display includes the depth line.

18. The sonar system disposed on the vessel of claim 17, wherein the program instructions which, when executed by the sonar signal processor, further cause the processor to:
create one or more clusters of the point cloud data;
identify the largest cluster of the one or more clusters;
identify one or more remaining clusters of the one or more clusters that are within a minimum Cartesian distance of the largest cluster; and
connect the largest cluster to the one or more remaining clusters using the depth line.

19. A non-transitory computer-readable medium having stored thereon computer-executable instructions which, when executed by a computer, cause the computer to:
receive sonar data from the transducer array, wherein the transducer array includes a plurality of transducer elements spaced apart at one or more known distances and configured to receive respective sonar return signals for conversion into the sonar data, and wherein the sonar data corresponds to a marine environment proximate to the vessel;

generate point cloud data based on the received sonar data;

generate a depth display based on the point cloud data, wherein the depth display includes a depth line representing an underwater floor of the marine environment, wherein the depth line is generated using the point cloud data; and display the depth display, wherein the depth display includes the depth line.

20. The non-transitory computer-readable medium of claim 19, wherein the computer-executable instructions which, when executed by a computer, further cause the computer to:

create one or more clusters of the point cloud data;

identify the largest cluster of the one or more clusters;

identify one or more remaining clusters of the one or more clusters that are within a minimum Cartesian distance of the largest cluster; and connect the largest cluster to the one or more remaining clusters using the depth line.

* * * * *